United States Patent
Marietta et al.

(10) Patent No.: US 9,436,626 B2
(45) Date of Patent: Sep. 6, 2016

(54) PROCESSOR INTERRUPT INTERFACE WITH INTERRUPT PARTITIONING AND VIRTUALIZATION ENHANCEMENTS

(75) Inventors: Bryan D. Marietta, Cedar Park, TX (US); Gary L. Whisenhunt, Leander, TX (US); Kumar K. Gala, Austin, TX (US); David B. Kramer, Cedar Park, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 781 days.

(21) Appl. No.: 13/570,874

(22) Filed: Aug. 9, 2012

(65) Prior Publication Data

US 2014/0047150 A1 Feb. 13, 2014

(51) Int. Cl.
*G06F 13/26* (2006.01)
*G06F 9/50* (2006.01)
*G06F 9/45* (2006.01)
*G06F 13/14* (2006.01)
*G06F 13/24* (2006.01)
*G06F 9/455* (2006.01)

(52) U.S. Cl.
CPC ........... *G06F 13/26* (2013.01); *G06F 9/45533* (2013.01); *G06F 9/5077* (2013.01); *G06F 13/14* (2013.01); *G06F 13/24* (2013.01)

(58) Field of Classification Search
CPC ........ G06F 13/14; G06F 13/24; G06F 13/26; G06F 9/5077; G06F 9/4558
USPC ......................................................... 710/264
See application file for complete search history.

(56) References Cited

U.S. PATENT DOCUMENTS

| | | | |
|---|---|---|---|
| 4,133,030 A | 1/1979 | Huettner et al. | |
| 5,193,187 A | 3/1993 | Strout et al. | |
| 5,600,805 A | 2/1997 | Fredericks et al. | |
| 5,659,756 A | 8/1997 | Hefferon et al. | |
| 6,598,069 B1 * | 7/2003 | Rooney et al. | 718/104 |
| 6,865,688 B2 | 3/2005 | Dawkins et al. | |
| 7,162,560 B2 | 1/2007 | Taylor et al. | |
| 7,209,994 B1 | 4/2007 | Klaiber et al. | |
| 7,272,664 B2 | 9/2007 | Arimilli et al. | |
| 7,296,133 B2 | 11/2007 | Swanberg | |
| 7,302,511 B2 | 11/2007 | Jeyasingh et al. | |
| 7,533,207 B2 | 5/2009 | Traut et al. | |
| 7,606,995 B2 | 10/2009 | Herrell et al. | |
| 7,617,340 B2 | 11/2009 | Gregg | |
| 7,660,912 B2 | 2/2010 | Gregg | |
| 7,689,747 B2 | 3/2010 | Vega et al. | |
| 7,752,378 B2 * | 7/2010 | Fukumura et al. | 710/317 |
| 7,818,751 B2 | 10/2010 | Togawa | |
| 7,835,356 B2 | 11/2010 | Bar-Kovetz et al. | |

(Continued)

OTHER PUBLICATIONS

Freescale Semiconductor, Inc., EREF 2.0: A Programmer's Reference Manual for Freescale Power Architecture® Processors, Rev. 0, Sep. 2011.

(Continued)

*Primary Examiner* — Henry Tsai
*Assistant Examiner* — Christopher A Daley

(57) ABSTRACT

A method and circuit for a data processing system (200) provide a processor-based partitioned priority blocking mechanism by storing interrupt identifiers, partition identifiers, thread identifiers, and priority levels associated with accepted interrupt requests in special purpose registers (35-38) located at the processor core (26) to enable quick and efficient interrupt priority blocking on a partition basis.

20 Claims, 6 Drawing Sheets

(56) References Cited

U.S. PATENT DOCUMENTS

| | | | |
|---|---|---|---|
| 7,849,247 B2 | 12/2010 | Marietta et al. | |
| 7,849,327 B2 | 12/2010 | Leung et al. | |
| 7,912,062 B2 | 3/2011 | Gulati et al. | |
| 7,987,464 B2 * | 7/2011 | Day et al. | 718/104 |
| 8,041,920 B2 | 10/2011 | Konfaty et al. | |
| 8,108,736 B2 | 1/2012 | Uchibori | |
| 8,131,901 B2 | 3/2012 | Mansell et al. | |
| 8,175,271 B2 | 5/2012 | Belgaied et al. | |
| 8,176,487 B2 | 5/2012 | Armstrong et al. | |
| 8,281,315 B2 | 10/2012 | Ault et al. | |
| 8,453,143 B2 | 5/2013 | Mahalingham et al. | |
| 8,489,789 B2 * | 7/2013 | Serebrin et al. | 710/267 |
| 8,560,782 B2 | 10/2013 | Marietta et al. | |
| 8,589,934 B2 | 11/2013 | Makljenovic et al. | |
| 8,782,314 B2 * | 7/2014 | Kothari et al. | 710/260 |
| 9,229,884 B2 | 1/2016 | Marietta et al. | |
| 2003/0061423 A1 | 3/2003 | Rankin et al. | |
| 2003/0115443 A1 | 6/2003 | Cepulis et al. | |
| 2004/0205272 A1 * | 10/2004 | Armstrong et al. | 710/260 |
| 2004/0215860 A1 | 10/2004 | Armstrong et al. | |
| 2006/0212642 A1 | 9/2006 | Takahashi et al. | |
| 2007/0208885 A1 | 9/2007 | Otsuka | |
| 2008/0126652 A1 * | 5/2008 | Vembu et al. | 710/268 |
| 2008/0141277 A1 * | 6/2008 | Traut et al. | 719/313 |
| 2008/0162734 A1 | 7/2008 | Uehara et al. | |
| 2008/0209182 A1 | 8/2008 | Snyder et al. | |
| 2008/0267193 A1 | 10/2008 | Fought et al. | |
| 2008/0320194 A1 | 12/2008 | Vega et al. | |
| 2008/0320272 A1 | 12/2008 | Fukumura et al. | |
| 2009/0282211 A1 | 11/2009 | Hoover et al. | |
| 2010/0095039 A1 | 4/2010 | Marietta et al. | |
| 2010/0146344 A1 | 6/2010 | Uchibori | |
| 2011/0072220 A1 | 3/2011 | Marietta et al. | |
| 2012/0159245 A1 * | 6/2012 | Brownlow et al. | 714/23 |
| 2013/0326102 A1 | 12/2013 | Marietta et al. | |
| 2014/0047149 A1 | 2/2014 | Marietta et al. | |

OTHER PUBLICATIONS

Non-final office action dated Jul. 29, 2014 in U.S. Appl. No. 13/460,297.
Final office action dated Dec. 4, 2014 in U.S. Appl. No. 13/460,297.
Notice of Alowance dated Oct. 23, 2015 in U.S. Appl. No. 13/460,297.
Non-final office action dated Sep. 8, 2014 in U.S. Appl. No. 13/485,120.
Non-final office action dated Dec. 23, 2014 in U.S. Appl. No. 13/485,120.
Final office action dated Apr. 2, 2015 in U.S. Appl. No. 13/485,120.
Notice of Alowance dated Aug. 12, 2015 in U.S. Appl. No. 13/485,120.
Non-final office action dated Sep. 23, 2014 in U.S. Appl. No. 13/570,843.
Notice of Allowance dated Mar. 16, 2016 in U.S. Appl. No. 13/570,843.
Notice of Allowance dated Jun. 13, 2016 in U.S. Appl. No. 13/570,843.

* cited by examiner

PROCESSOR INTERRUPT INTERFACE WITH INTERRUPT PARTITIONING AND VIRTUALIZATION ENHANCEMENTS

BACKGROUND OF THE INVENTION

1. Field of the Invention

The present invention is directed in general to data processing systems. In one aspect, the present invention relates to interrupt management in a data processing system that employs more than one partition.

2. Description of the Related Art

With data processing systems having multiple processors on a single integrated circuit, interrupt processing by a processor can be delayed when multiple processors are vying for access to the interrupt controller using busses which transfer the information between a processor and the memory mapped register in the interrupt controller. In addition, the interrupt controller in such multi-processor systems may include interrupt prioritization and blocking mechanisms that control interrupt priority blocking based solely on interrupt priority on a per-processor core basis to deliver the highest priority interrupt directly to the targeted processor core in a low-latency fashion. But such mechanisms do not address the interrupt management requirements of a partitioned/virtualized system or explicitly handle multi-threaded processors in data processing systems where the physical or hardware resources are divided into resource subsets or logical partitions which virtually operate as a separate computer, where each partition typically contains a processor core and other specified resources or specified portions of a resource such as memory within the system. These shortcomings add software complexity to interrupt management with a corresponding loss of system performance. Accordingly, a need exists for an improved system and methodology for managing interrupts in a data processing system that address various problems in the art where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
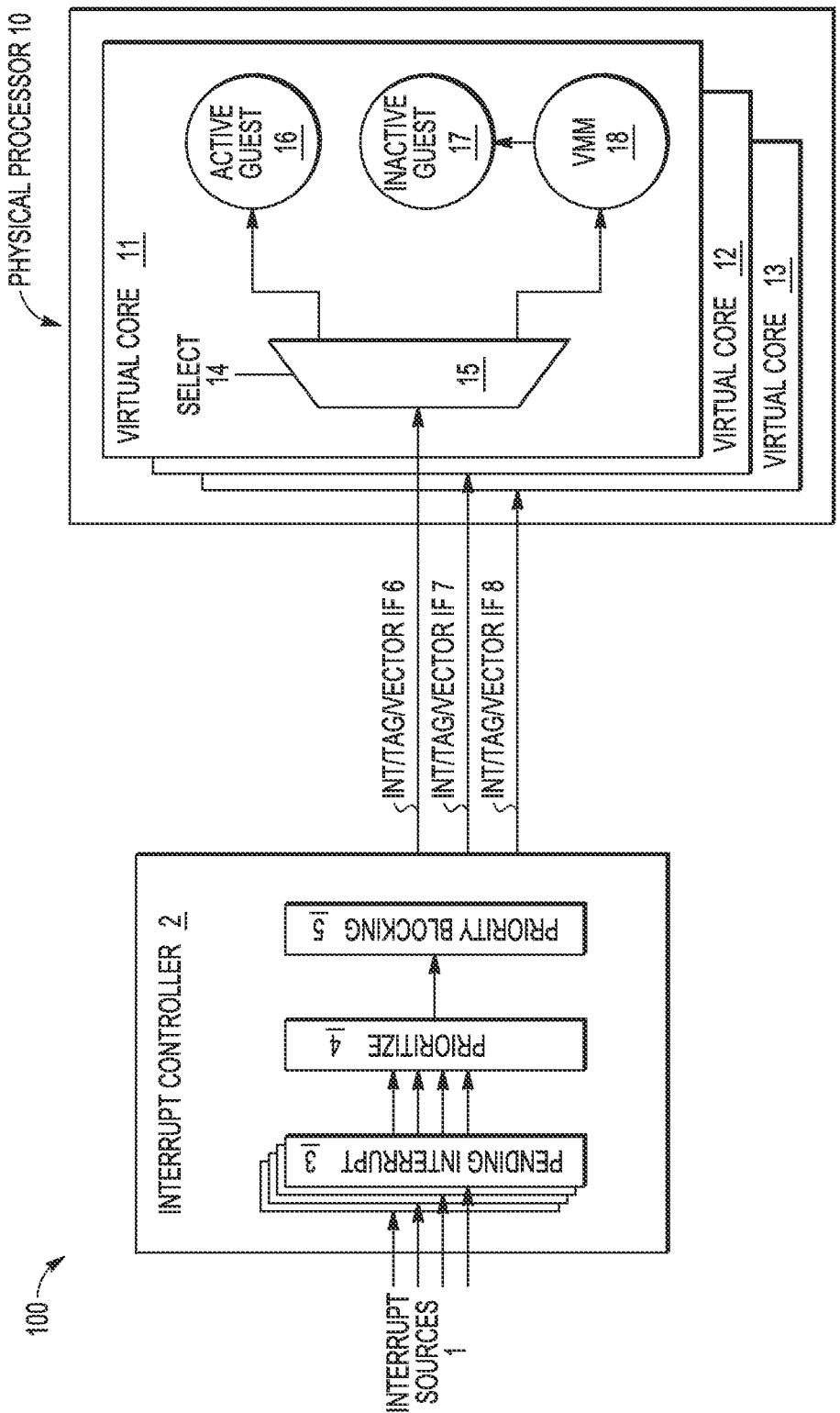
FIG. 1 is a simplified block diagram of an interrupt processing system for managing interrupt requests to a plurality of virtual cores with an interrupt controller which performs priority blocking to send interrupts over separate interfaces to the virtual cores.

A system, apparatus, and methodology are described for managing partitioned interrupt requests to virtual cores with a processor-based interrupt management and programming model which uses processor core registers to evaluate partition ownership information, priority, and interrupt IDs delivered directly with the interrupt request over a single shared interface between the interrupt controller and the virtual cores, thereby simplifying the design of the interrupt controller architecture and reducing access time and programming complexity associated with managing virtualized interrupts in a multi-threaded processor. When an interrupt request is presented over the shared interface to the processor, interrupt context information is also conveyed, including interrupt ID, partition ID, thread ID, priority level, and additional interrupt message data, enabling the interrupt management system to directly deliver interrupts and their associated context information to the target partition without intervention by a hypervisor program. At the processor, the received partition ID is used to take the interrupt in the appropriate target partition directly without hypervisor intervention by comparing the received partition ID from the interrupt request with partition ID values stored in processor core registers (e.g., logical partition ID registers). Depending on the matching partition ID processor core register, a priority level value from the interrupt request is compared to a priority level stored in a selected processor core register (e.g., an Interrupt Priority Level Register) to determine if the interrupt request is blocked or forwarded to the targeted virtual processor (thread). When an interrupt is taken, the received interrupt context information is stored in one or more processor core registers to give software information about what interrupt has been taken. For example, an external proxy register (EPR) at the processor stores the received interrupt ID and vector information for interrupts directed to the hypervisor operating system, a guest external proxy register (GEPR) stores the received interrupt ID and vector information for interrupts directed to the guest operating system, an external process ID register (EPIDR) stores the received interrupt message data for interrupts directed to the hypervisor operating system, and a guest external process ID register (GEPIDR) stores the received interrupt message data for interrupts directed to the guest operating system. In this way, the received interrupt IDs and associated context information are used to provide interrupt management capability that does not require first-presented, last-completed (i.e., stack ordering) ordering by software. By providing an explicit interrupt identifier to the processor core, software running on the core can service interrupts and manage the interrupt states at the interrupt controller in whatever order is desired for the overall system with minimal latency and software overhead. For example, EOIs (end of interrupts) handling is no longer required to be stack-based (last-presented, first-completed). In addition, by providing the processor core with a target virtual processor ID attribute, the interrupt interface (wires) can be shared among multiple virtual processors, reducing wiring congestion and die complexity.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in simplified schematic diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

With existing data processing systems, interrupt priority blocking is controlled on a per-processor core basis using interrupt blocking mechanisms located at the interrupt controller to send prioritized, non-blocked interrupts over separate interfaces to the virtual cores. However, there are performance issues associated with accessing or changing the interrupt blocking mechanisms at the interrupt controller which handles interrupt priority on a per-processor core basis. These performance issues can include significant access time penalties when processing interrupt requests with partitioned or virtualized machines, such as interrupt requests targeted for a partition not currently in execution or interrupt requests that are not currently selected by the presentation arbitration for processing by the processor. In addition, there are additional wiring congestion and circuit complexity costs associated with having separate interrupt interface wires to each virtual core. To illustrate these performance issues and complexity costs, reference is now made to FIG. 1 which depicts a simplified block diagram of an interrupt processing system 100 for managing interrupt requests to a plurality of virtual cores 11-13 running on a physical processor 10 using an interrupt controller 2 which performs priority blocking to send interrupts over separate interfaces 6-7 to the virtual cores 11-13 for servicing. Over each interface (e.g., 6), the interrupt may include an interrupt request (INT), along with a peripheral-specific interrupt source ID or tag (TAG) and vector associated with the interrupt request. As depicted, the interrupt controller 2 receives interrupt requests from a plurality of interrupt sources 1 and stores all pending interrupt requests at storage devices 3. The pending interrupts are then prioritized at the arbitration circuit or module 4 to generate prioritized interrupt requests. Next, priority blocking is performed on the prioritized interrupt requests using an interrupt priority blocking register 5 at the interrupt controller 2. If a pending interrupt request from a source to a designated virtual core 11 has the highest priority (as determined at the arbitration circuit or module 4) and is higher priority than the blocking condition (as determined at the interrupt priority blocking register 5), it is sent to the targeted virtual core 11 over one or more interface signal lines 6. At the targeted virtual core 11, any interrupt request must be routed to the appropriate partition (e.g., the virtual machine manager (VMM) 18 or a guest operating system 16, 17), such as by using a multiplex routing circuit 15 controlled by a software-based select signal 14. If the presented interrupt request is directed to the VMM 18 or the active guest operating system (OS) 9, the interrupt request can be serviced immediately, provided that the interrupt is directed to the recipient partition. But if the interrupt presented to the recipient partition (e.g., an active guest) is directed to a different partition (e.g., the VMM or an inactive guest), the recipient partition must act an intermediary to relay or route the interrupt to the actual target. Alternatively, if the presented interrupt request is directed to an inactive guest OS 17, the VMM 18 may initiate a partition switch to the partition associated with the interrupt request, and then inform the interrupt controller 2 on each partition switch for each virtual processor in the partition. If a prioritized unblocked interrupt request is targeted to another virtual core, it is sent to the targeted virtual core 12, 13 over separate interface signal line(s) 7, 8, respectively.

As seen from the foregoing, the location of the interrupt priority blocking register 5 at the interrupt controller 2 creates a number of performance problems and signaling complexities, such as routing of interrupt requests by intermediate recipient partitions when the interrupt request does not include a partition identifier, delays associated with partition switches at the interrupt controller, and separate interface signal lines. While including a partition identifier with the interrupt request helps address the interrupt request routing problem, any change in the priority blocking conditions stored at the interrupt controller 2 must still be managed completely through software using the VMM 18, which adds delay, overhead, and complexity that can adversely affect system performance. The additional overhead and complexity is especially significant in a partitioned machine where the VMM 18 or active guest 16 must process an interrupt request that has no associated partition information and is targeted to a partition that is not currently in execution (e.g., inactive guest OS 17). In cases where the VMM 18 must take every interrupt, interrupt response time can be very poor.

Figure 2:
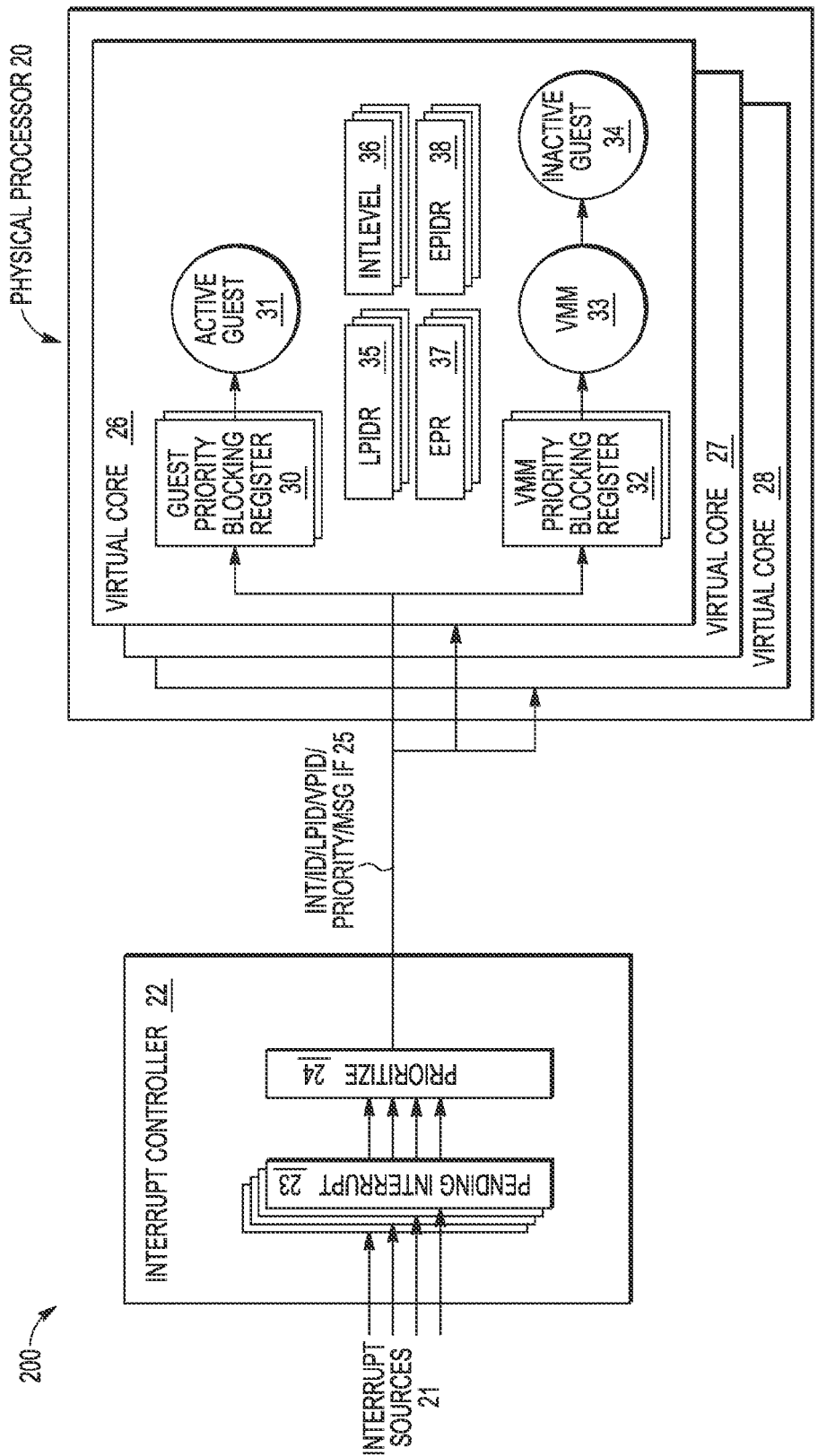
FIG. 2 is a simplified block diagram of an interrupt processing system for managing interrupt requests using special purpose registers at a physical processor with an interrupt controller which sends interrupts over a single interface to a plurality of virtual cores in accordance with selected embodiments of the present invention.

To reduce the software overhead, circuit complexity, and access delays, a virtualized interrupt management mechanism is provided at the physical processor for quickly and efficiently processing interrupt requests at the targeted processor core by introducing partition-based in-core blocking registers to allow independent priority management. To illustrate selected embodiments, reference is now made to FIG. 2 which depicts a simplified block diagram of an interrupt processing system 200 in which external sources 21 present interrupt requests 23 to the interrupt controller 22. Using the arbitration circuit or module 24, the outstanding interrupt requests 23 are prioritized for presentation over one or more shared interface signal lines 25 to one of the virtual cores 26-28 running on a physical processor 20. Because there are no blocking conditions at the interrupt controller 22, the design and operation of the interrupt controller 22 may be simplified since there is no blocking logic in the interrupt controller 22.

A targeted virtual core (e.g., 26) manages interrupt requests with a sophisticated interrupt management mechanism which uses special purpose interrupt priority registers 35-38 located at the physical processor 20 to evaluate partition, thread, priority level, interrupt message data, and interrupt IDs delivered directly with the interrupt request (INT) over the shared interface 25 by the interrupt controller 22. The priority registers may include one or more LPID registers 35, one or more INTLEVEL registers 36 (for storing interrupt priority levels for hypervisor and guest partitions), one or more external proxy registers (EPR) 37 (for storing peripheral-specific interrupt vector and identifiers for hypervisor and guest partitions), and one or more external process ID registers (EPIDR) 38 (for storing interrupt message data, such as an interrupt source error code, associated with an interrupt request that is directed to the hypervisor or guest to provide additional information about the interrupt request). By simultaneously applying the delivered interrupt request to local interrupt priority blocking registers 30, 32 associated with different partitions, different partitions can quickly and efficiently control interrupt blocking conditions independently from one another. If a pending interrupt request from a source has the highest priority (as determined at the arbitration circuit or module 24) and is higher priority than the blocking condition specified for a given partition (as determined at the interrupt priority blocking register 30, 32), it is sent to the appropriate partition (e.g., active guest OS 31 or VMM 33) at the targeted virtual core 26. In this way, an interrupt request directed to the VMM 33 (as determined by a logical partition identifier (LPID) included with the interrupt priority request) and having a higher priority than the blocking condition for that partition (as determined by the VMM priority blocking register 32) can be serviced immediately by the VMM 33. However, if the interrupt request directed to the VMM 33 has a priority that does not meet the blocking condition for that partition (as determined by the VMM priority blocking register 32), then the interrupt request is blocked, in which case the interrupt request is either eventually replaced with a higher priority interrupt, retracted by the source, or the blocking register is re-programmed with a low enough value. In similar fashion, if the presented interrupt request is directed to an inactive guest OS 34, the VMM 33 may initiate a partition switch to the partition associated with the interrupt request without requiring any control signaling to the interrupt controller 22, provided that the interrupt request has a priority that is higher than the blocking condition for that partition specified in the VMM priority blocking register 32. Finally, a presented interrupt request that is directed to an active guest OS 31 may be serviced immediately by the active guest OS 31, provided that the interrupt request has a priority that is higher than the blocking condition for that partition specified in the guest priority blocking register 30. Since local interrupt priority blocking registers 30, 32 are located and partitioned at the physical processor 20 as separate special purpose registers, an active guest partition 31 can quickly and efficiently control blocking conditions specified in the guest priority blocking register 30 independently from the VMM 33 and without VMM intervention. An additional advantage of using local interrupt priority blocking registers 30, 32 at the physical processor 20 is that partition switches do not require reconfiguration of the interrupt controller 22.

The interrupt controller 22 uses the shared interface 25 to deliver interrupt requests and additional context information to any of the virtual cores 26-28 running on the physical processor 20. In selected embodiments, the additional context information includes an explicit interrupt identifier (ID), a logical partition identifier (LPID), the target thread within the processor core (VPID), the interrupt priority value (Priority), and additional interrupt message data (MSG). The conveyed LPID data is used to direct the interrupt to the recipient partition (e.g., hypervisor or guest) in the targeted virtual core, allowing secure direct-to-guest delivery (without hypervisor interventions) or to hypervisor for out-of-service partitions or hypervisor interrupts. In addition, the conveyed priority value allows partition-based interrupt blocking to be done at the targeted processor core (e.g., 26) instead of the interrupt controller 22, simplifying the interrupt controller design and providing independent partition-based priority management. By conveying thread VPID data, multi-threaded cores 26-28 can be explicitly supported over the single, shared interface 25 so that there is no longer a need to provide unique and separate interfaces to the physical core 20 for each thread. The message data allows the interrupt source to send a source-to-target data value that can be used for whatever purpose the system desires (e.g., an error code, a queue status message, a software defined "magic" value, etc.). Finally, the conveyed explicit interrupt identifier (ID) allows the out-of-order interrupt state management in the interrupt controller.

Figure 3:
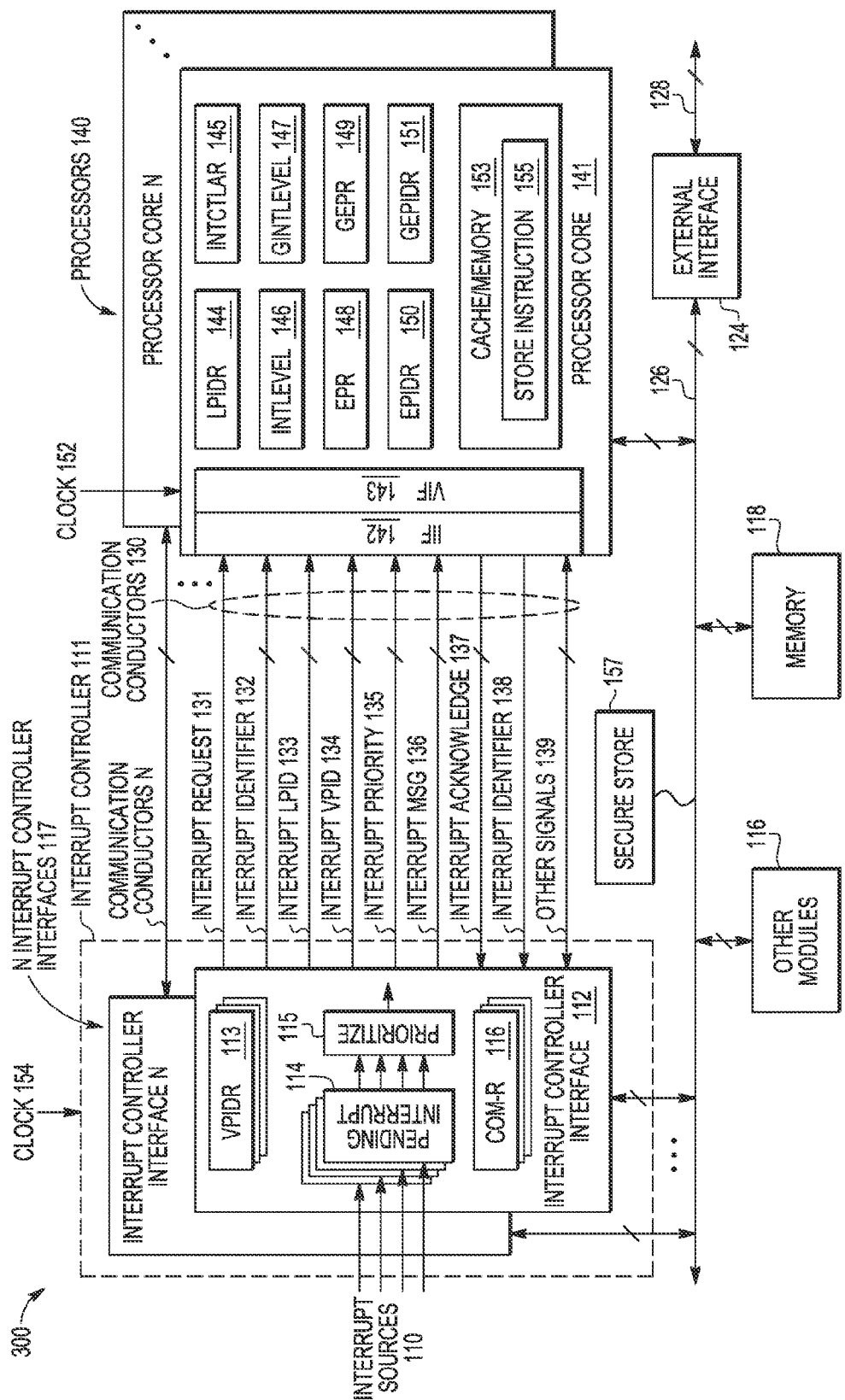
FIG. 3 is a simplified block diagram of a system for managing physical interrupt requests on a partition basis using special purpose registers at the processor core without having to perform memory mapped operations to an interrupt controller in accordance with selected embodiments of the present invention.

To illustrate additional embodiments, reference is now made to FIG. 3 which depicts a simplified block diagram of a data processing system 300 for managing physical interrupt requests on a partition basis using special purpose registers at a processor core (e.g. 141) without having to perform memory mapped operations to an interrupt controller 111. The depicted data processing system 300 includes one of more processors 140 connected to an interrupt controller 111 over a plurality of shared communication conductors 130. In addition, an interconnect circuit, bus or other connectivity mechanism 126 provides a memory-mapped interface for connecting the processor(s) 140 to the interrupt controller 111, one or more other modules 116, one or more memories 118, and external interfaces 124. Clock signals 154, 152 are provided, respectively, to the interrupt controller 111 and processor(s) 140 which may have either an arbitrary phase and frequency relationship, or a known or predetermined relationship, with one another. Though illustrated as being formed on a single integrated circuit, the data processing system 300 may be provided on a plurality of integrated circuits.

In selected embodiments where the data processing system 300 is partitioned, different physical hardware resources (e.g., processors, controllers, and memory) are grouped together in a "partition" to perform a specified function (such as executing an operating system). In embodiments where the data processing system 300 supports virtualization, one or more of the hardware resources (e.g., a processor or core) may be emulated or abstracted with a software implementation that is executed on a single hardware platform (e.g., a physical processor) to behave like the actual hardware resource (e.g., a virtual processor or virtual core). With virtualization, a physical "processor" (e.g., a physical entity with physical pins to receive the interrupt signals) executes programming code to emulate a "virtual processor" (e.g., a thread of execution within the physical processor) which cannot tell that it is running on multi-threaded processor using shared resources and behaves as it is a physical processor. Thus, virtualization allows the simultaneous execution of several (different) operating systems on a single hardware platform, such as by using a hypervisor operating system abstract or emulate the hardware so that several operating systems can run on the same physical system by providing the guest operating system with virtualized hardware. For example, in embodiments where a processor core implements multithreading, each hardware thread having a thread private architecture state may be considered to be a virtual processor core N. Using virtualization, the data processing system 300 can be organized into one or more logical partitions to represent a collection of actual or emulated hardware resources so that a single virtual computing machine runs on a single logical partition on one or more virtual processors. Within each logical partition, there may be a shared or private memory, one or more processors and a collection of accelerators and I/O devices. Each of these resources, including the processors, may be actual dedicated hardware or may be implemented by partially or completely virtualized hardware.

In the data processing system 300, the processor(s) 140 include N processor cores (including processor core 141 and processor core N) that may be directly connected over N communication conductors (including communication conductors 130) to N interrupt controller interfaces 117 (including interrupt controller interface 112 and interrupt controller interface N) in the interrupt controller 111, where N is an integer greater than or equal to one. In other embodiments, the N processor cores in the processor 140 are directly connected over a shared communication conductor 130 to the interrupt controller 111. As a result, each of the N interrupt controller interfaces 117 may be coupled to the processors 140 by way of one or more shared communication conductors (e.g., communication conductors 130). In addition, both the processor(s) 140 and N interrupt controller interfaces 117 may be bi-directionally coupled to the interconnect/bus circuit 126. As for the other modules 116, these may include any type of circuitry, such as, for example, timers, drivers, communication ports, etc. Similarly, memory 118 may include any type of memory, such as, for example, random access memory, read only memory, various types of non-volatile memory, etc. Finally, the external interfaces 124 connects the interconnect/bus circuit 126 to one or more external interrupt sources by way of one or more terminals or conductors 128.

The depicted communication conductor(s) 130 may be used to convey an interrupt request indicator 131, an interrupt identifier (ID) 132, a hypervisor configured interrupt logical partition identifier (LPID) 133, an interrupt thread identifier (VPID) 134, an interrupt priority value 135, and interrupt message data 136 which are provided by the interrupt controller interface 112 to processor core 141. In this way, an interrupt request indication 131 is accompanied by additional context information 132-136 which may be defined by software during configuration of interrupts and/or by the hardware and used to process the interrupt request. In addition, the depicted communication conductors 130 may include an interrupt acknowledge 137 and interrupt identifier 138. The communication conductors 130 may also include one or more other signals 139 for conveying additional information (e.g., interrupt context information), where the other signals 139 may be bidirectional, uni-directional from interrupt controller interface 112 to processor core 141, or uni-directional from processor core 141 to interrupt controller interface 112. As will be appreciated, the signaling information provided by conductors 131-136 may be provided by way of any one or more separate or shared conductors, and the information provided by conductors 137-138 may be provided by way of any one or more separate or shared conductors.

In operation, external interrupt sources 110 present physical interrupt requests to the interrupt controller 111 where they are stored as pending interrupts 114 and then sorted with the prioritization circuitry 115 for presentation to the processor core 141 as an interrupt package including an interrupt request 131 along with associated context information (e.g., 132-136). In particular, sorting or prioritization circuitry 115 at the interrupt controller 111 sorts the pending interrupt requests 114 so that only the top or highest priority interrupt request 131 for a particular target processor 141 is presented or asserted to the target processor along with its associated context information. Upon accepting the interrupt, the processor 141 returns an interrupt acknowledge 137 to the interrupt controller 111, along with the same interrupt identifier 138.

To support partitioned interrupt processing, the processor 141 includes an interrupt interface (IIF) 142 whereby a global interrupt controller (interrupt controller 111) communicates with the processor 141 which may be a virtual processor or an actual, physical processor. In addition, a virtualized interface (VIF) 143 is provided as a hardware and/or software interface between the (virtual) processor and IIF 142. The interrupt interface 142 coordinates interrupt processing between the (virtual) processor 141 and the interrupt controller 111. With this arrangement, when the interrupt controller 111 sends the highest priority interrupt for a (virtual) processor, the VIF 143 conveys the interrupt to the (virtual) processor which decides whether to take the interrupt. With partitioned interrupts, the processor 141 can begin servicing the interrupt without having to perform memory mapped operations (e.g., over the interconnect circuit/bus 126) to the interrupt controller 111, thereby reducing service overhead and latency. Interrupt partitioning also allows interrupts to be targeted to the guest OS currently in execution, the hypervisor, or any guest OSes currently bound to the (virtual) processor which are not currently in execution. In this context, it is understood that a hypervisor (a.k.a., a virtual machine manager (VMM)) refers to a hardware virtualization technique which allows one or more operating systems, termed guests, to run concurrently on a host computer.

In order to control interrupt priority blocking on a partition basis, the processor core 141 includes special purpose registers 144, 146-149 which are used to store unique interrupt identifiers along with partition identifier and priority level information for one or more partitions resident at the processor core 141. In particular, logical partition identifier (LPID) values for each partition residing at a processor core 141 may be stored in one or more logical partition identifier registers (LPIDR) 144 as hypervisor-privileged registers. At the processor 141, the LPID 133 received with the interrupt is compared to the LPIDR register 144 to determine whether this is a hypervisor interrupt, a guest in execution interrupt, or a guest not in execution interrupt. In addition, priority level (PRILEVEL) values for selected partitions residing at a processor core 141 (e.g., the hypervisor or inactive guest OS partition) may be stored in one or more interrupt priority level registers (INTLEVEL) 146, where the stored priority level is defined by a plurality of bit positions in the interrupt priority level register which allow a range of priority levels associated with an interrupt request. For example, with a 10-bit priority level value, a priority level of all zeros (0) allows all interrupts with an LPID not equal to LPIDR 144 (all interrupts not directed to the active guest) to be taken. Correspondingly, a priority level of all ones (1023) blocks all interrupts. In operation, the INTLEVEL register 146 may be used by software to set and read the interrupt priority level of external input interrupts at the virtual processor 141 to prevent external input interrupts which have an LPID value not equal to the value in the LPIDR 144 which are a lower or equal to the stored priority level PRILEVEL from being taken.

If separate priority blocking is required for another partition residing at the processor core 141 (the active guest OS partition), then an additional guest interrupt priority level register (e.g., GINTLEVEL) 147 may be included at the processor core 141. As will be appreciated, the guest interrupt priority level register 147 may be defined to include a priority level field having any desired number of bits (e.g., 10 bits) and corresponding priority levels (e.g., ranging from 1 to 1023). In operation, the GINTLEVEL register 147 may be used by software to set and read the interrupt priority level of external input interrupts at the virtual processor 141 to prevent external input interrupts which have an LPID value equal to the value in the LPIDR 144 which are a lower or equal to the stored priority level PRILEVEL from being taken.

An interrupt that is presented to the processor core 141 is processed to compare the logical partition ID (LPID) value and priority level value conveyed with the interrupt request to priority level values (PRILEVEL) stored the normal and guest priority registers 146, 147. Depending on the LPID value and priority comparison result, the interrupt request is blocked or forwarded to the targeted virtual processor thread. A blocked interrupt sits in the blocked state in the processor core 141 until a higher priority interrupt is presented to the processor core 141, the interrupt is removed by the source, or the value in the priority register(s) 146, 147 is changed, at which time the presented interrupt is re-evaluated for forwarding.

The processor 141 uses the special processor executable instructions to handle one or more states for the partitioned interrupts to perform runtime interrupt management (e.g., standard run-time operations associated with interrupts for hypervisors, guests in execution, and guests not in execution) with minimal memory mapped interactions with an external interrupt controller, reducing overhead and latency. In handling the interrupt states for a received interrupt request, the processor 141 uses information associated with the interrupt request 131 which may be defined by software during configuration of interrupts and/or by the hardware and used to process the interrupt request. The associated information may include an explicit interrupt identifier (ID) 132 for the interrupt request, a hypervisor configured logical partition ID (LPID) value 133, a hypervisor configured target virtual processor or thread identifier (VPID) 134 for the interrupt request, a priority level (Priority) value 135 for the interrupt request, and/or additional interrupt message data (MSG) 136 that is conveyed with the interrupt identifier 131. At the processor 141, the LPID 133 received with the interrupt is compared to the LPIDR register 144 to determine whether this is a hypervisor interrupt, a guest in execution interrupt, or a guest not in execution interrupt. Depending on the virtual processor (thread) ID 134 of the interrupt, the interrupt request is routed to the targeted virtual processor core for the interrupt request. At the targeted virtual processor core, the blocking conditions are checked by comparing the priority level 135 received with the interrupt to the INTLEVEL register 146 or the GINTLEVEL register 147 (depending on the type of interrupt identified by the LPID value) to determine whether the interrupt request should be accepted or blocked. By providing the virtual processor (thread) ID 134, multi-threaded cores are explicitly supported at the processor core 141, so there is no longer a need to provide a unique signal interface to each of the N physical cores for each thread.

In specifying partition and priority level information for access requests, the SPRs 144, 146-147 may be used to process requests received from the interrupt controller 111 on a partition basis. In particular, when the LPID value 133 associated with the requested interrupt 131 is equal to the contents of a LPIDR register 144, the processor 141 takes the interrupt as a guest OS interrupt for the current partition in execution. But in cases where the LPID value 133 associated with the interrupt is not equal to the contents of the LPIDR register 144, the requested interrupt 131 may be processed by the hypervisor as a guest OS interrupt for a partition that is bound to the (virtual) processor 141, but that is not in execution. In addition, the requested interrupt 131 may be a hypervisor interrupt which is not associated directly with a partition. Once the partition associated with a requested interrupt 131 is determined, the SPRs 146-147 may be used to handle interrupt requests by performing interrupt priority level blocking depending on whether the interrupt requests are associated with the current guest OS in execution or are associated with either the hypervisor or a guest OS not in execution but bound to this virtual processor.

If the interrupt request is taken, the processor 141 may then store the received context information. For example, an external proxy register (EPR) 148 stores the interrupt ID 132 and any peripheral-specific interrupt vector information conveyed therein (or separately) for interrupts directed to the hypervisor. In addition, a guest external proxy register (GEPR) 149 stores the interrupt ID 132 and any peripheral-specific interrupt vector information for interrupts directed to an active guest. When the EPR 148 or GEPR 149 are set, an external process ID register (EPIDR) may be used to store interrupt message data 136 associated with an interrupt request that is directed to the hypervisor to provide additional information about the interrupt request (e.g., an interrupt source error code) for use during interrupt servicing. In similar fashion, a guest external process ID register (GEPIDR) may be used to store interrupt message data 136 associated with an interrupt request that is directed to an active guest to provide additional information about the interrupt request for use during interrupt servicing.

During servicing of the interrupt request 131, the target processor 141 may issue a partitioned command to the interrupt controller 111 by executing an interrupt controller store instruction 155 which performs a specialized store of the partitioned command, such as an EOI (end-of-interrupt) instruction, a "defer" instruction, an "activate" instruction, a "suspend" instruction, a "resume" instruction, or the like. When executed, the interrupt control store instruction causes the target processor to perform a secure store operation 157 by writing a partitioned command and hardware-inserted LPID value (and the desired interrupt ID) to a data payload which is securely stored to an interrupt controller command register (COM-R) 116 having an address which is stored in a dedicated interrupt controller address register (INTCTLAR) 145 at the core 141. To secure the partitioned command, the execution of the interrupt control store instruction 155 is managed by trusted software which uses values stored in dedicated registers at the processor 141. In particular, the processor 141 retrieves the LPID value from the LPIDR register 144 and encodes the retrieved LPID value—along with a command value (CMD)—into a data payload of a secure store operation 157. An interrupt identifier or tag associated with the interrupt (e.g., interrupt ID) may also be retrieved from a special purpose register and encoded in the data payload under control of the interrupt control store instruction 155 for use in uniquely identifying the targeted interrupt in the interrupt controller 111. In addition, the processor retrieves from the dedicated address register or interrupt control address (INTCTLAR) register 145 the real or physical address of the command register 116 for the store operation specified by the interrupt control store instruction 155. Finally, the processor completes the execution of the interrupt control store instruction 155 by performing a secure store operation 157 of the data payload over the interconnect/bus circuit 126 to the command register 116 of the interrupt controller 111 using the physical address stored in the interrupt control address (INTCTLAR) register 145, where the store operation stores the data payload which includes the LPID value, interrupt ID, and associated command (CMD). By controlling access to the special purpose registers (SPRs) 144-145 with trusted higher-level software (e.g., the hypervisor), the physical address and LPID assigned to the access are prevented from being controlled by a requesting program.

Figure 4:
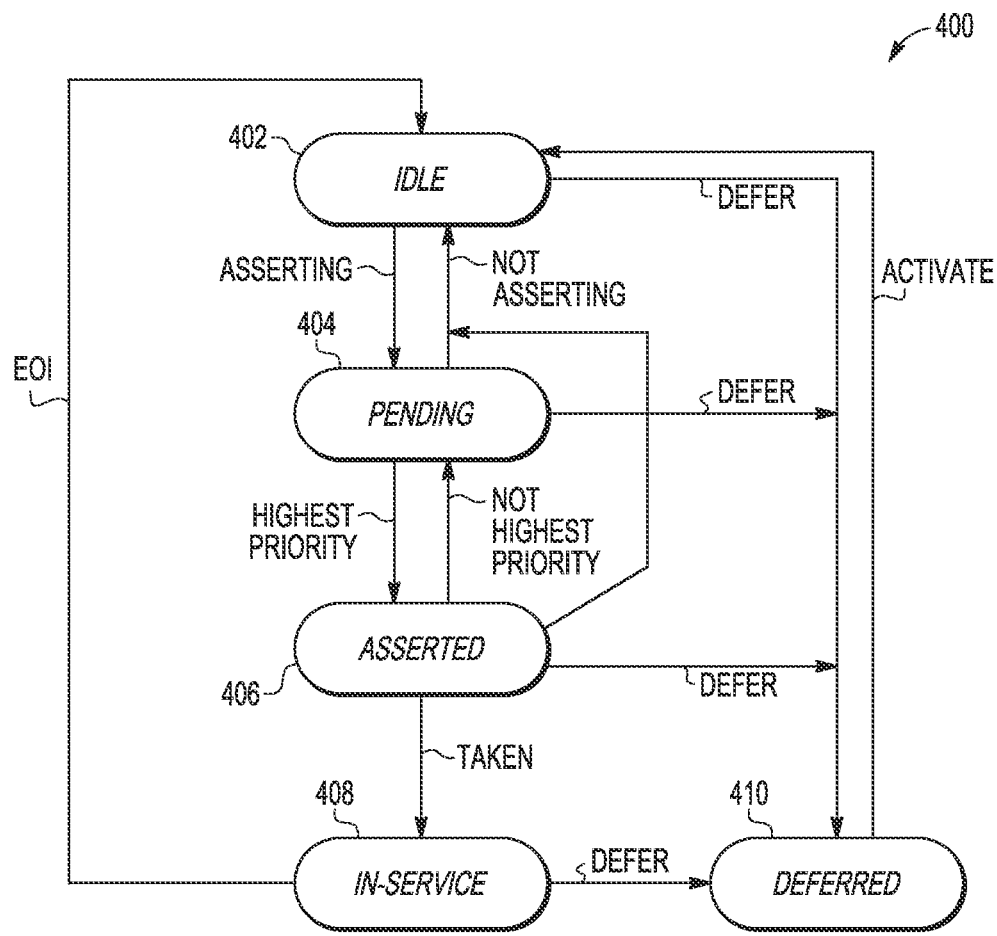
FIG. 4 is a state diagram illustrating the handling of an interrupt request in accordance with selected embodiments of the present invention.

To illustrate how the interrupt request and associated context information may be used to provide out-of-order interrupt state management for interrupt requests, reference is now made to FIG. 4 which shows a state diagram 400 of the different interrupt states in accordance with an example core programming model interface for processing interrupts. With the depicted programming model interface, interrupt virtualization is provided to allow interrupts targeted to the guest OS currently in execution, the hypervisor, and any guest OSes currently bound to the processor which are not currently in execution. As will be appreciated, inactive guests do not perform normal-operation on interrupts since the partition and associated software is not in execution, but for the purposes of this definition, such normal-operation consists of taking interrupts for guests not in service in the hypervisor which will then defer the interrupt or initiate a partition switch to the partition associated with the interrupt, and reflect the interrupt to that partition.

In an initial "idle" state 402, the interrupt is idle and is not currently asserting. Once the source of an interrupt has requested an interrupt, the interrupt moves to the "pending" state 404 over the "asserting" transition. In the "pending" state 404, the interrupt is processed by the interrupt controller (e.g., interrupt controller 114) and contends with all other interrupts bound to the same (virtual) processor to be selected as the highest priority interrupt. Conversely, once the interrupt is no longer asserting (e.g., when the source of the interrupt has withdrawn its request for an interrupt), the interrupt state returns to the "idle" state 402 over the "not asserting" transition.

If the interrupt has the highest priority, it moves to the "asserted" state 406 over the "highest priority" transition. At the "asserted" state 406, the interrupt is sent from the interrupt controller to the processor as the current highest priority interrupt. Conversely, once the interrupt is no longer the highest priority asserting interrupt at the (virtual) processor, the interrupt state returns to the "pending" state 404 over the "not highest priority" transition. If the interrupt is no longer asserting because the interrupt request was withdrawn, the interrupt state returns to the "idle" state 402 over the "not asserting" transition.

At some point in time, the processor will take the interrupt if it is not blocked and may update one or more special purpose registers with tag and attribute or context information for the interrupt, and may send an interrupt acknowledge (IACK) to indicate the presented interrupt was accepted by the virtual processor for processing. The acknowledged interrupt source is no longer eligible for selection for presentation until the interrupt servicing has been completed. Conversely, a blocked interrupt cannot be taken and is not acknowledged. Once acknowledged, an unblocked interrupt enters the "in-service" state 408 over the "taken" transition. During the "in-service" stage, the virtual processor begins servicing the interrupt, and information about the interrupt is used to determine whether the interrupt is taken in the guest state or the hypervisor state. When the interrupt service is completed, an end-of-interrupt command may be performed when the processor executes an interrupt control instruction to write the EOI command with the associated interrupt tag and LPID value to the interrupt controller. As a result, the interrupt returns to the "idle" state 402 from the "in-service" state 408 over the end-of-interrupt "EOI" transition.

In accordance with selected embodiments, the processor may use the interrupt request and associated context information at any time to delay acceptance of an interrupt request by moving the interrupt to a "deferred" state 410 from any of the "idle," "pending," "asserted," or "in-service" states so that servicing of the deferred interrupt is delayed until a later time. In addition, a DEFER command, interrupt ID and LPID value may be encoded in a data payload of a secure write operation to a specified command register at the interrupt controller. The interrupt controller then uses the interrupt tag and the LPID conveyed to manage the deferred interrupt independent from other interrupts. With the "deferred" state 410, all of the interrupt controller information on the deferred interrupt is left intact, but the interrupt is taken out of the presentation arbitration decision until activated by software. This allows other, lower priority, interrupts to be presented for servicing.

When the guest OS (or hypervisor) decides to service the deferred interrupt, the interrupt may be returned to the "idle" state 402 over the "activate" transition. To this end, the processor may securely encode an ACTIVATE command with the associated interrupt ID and LPID value to the interrupt command register of the interrupt controller to re-enable the interrupt for presentation.

Figure 5:
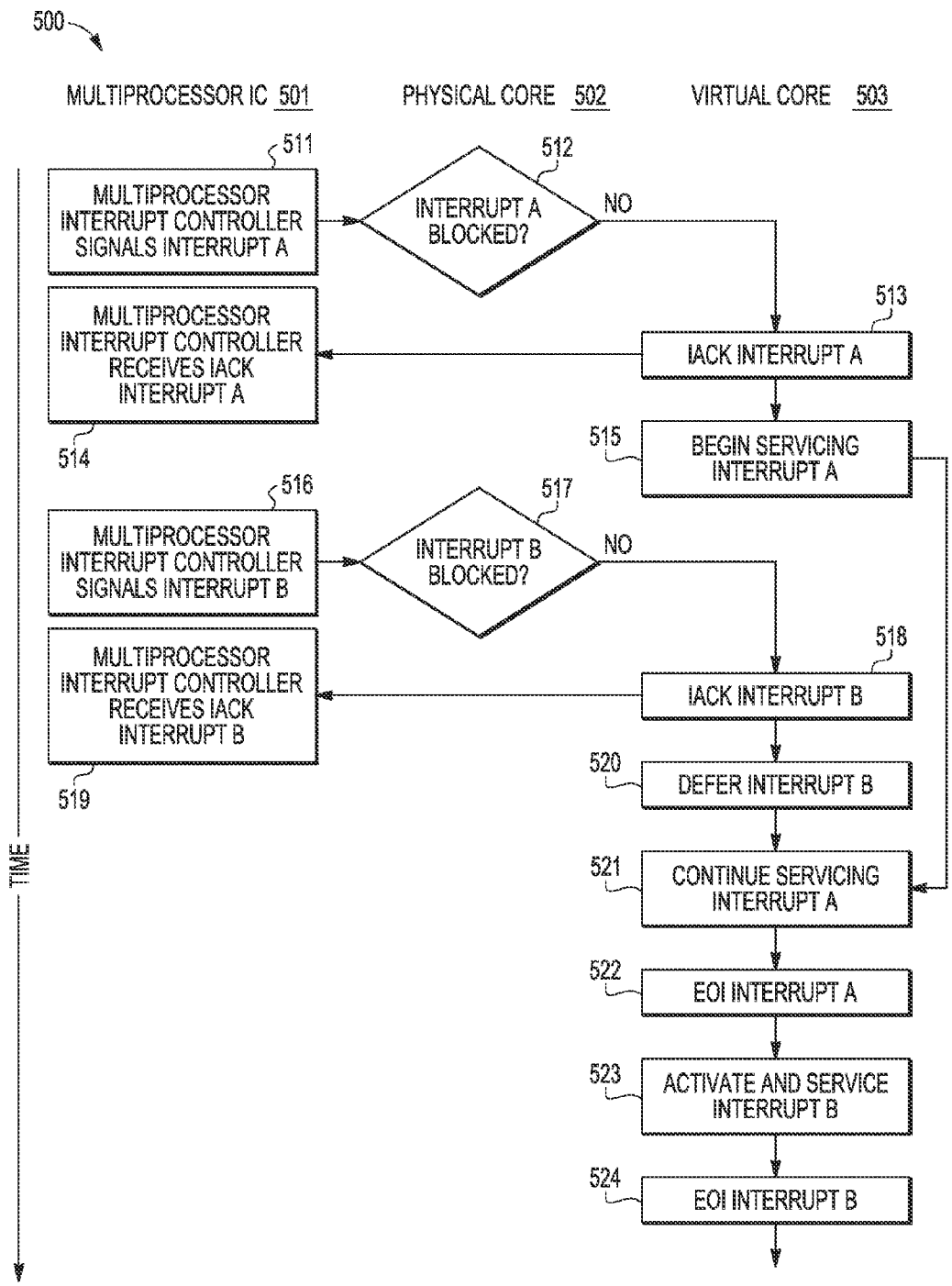
FIG. 5 depicts an example process sequence for servicing a plurality of interrupts at physical processor using interface signals conveyed with the interrupt requests.

To further illustrate an example out-of-order interrupt state management whereby servicing of a first interrupt is completed before a second interrupt is serviced, reference is now made to FIG. 5 which depicts an example process sequence 500 for servicing a plurality of interrupts (Interrupt A and Interrupt B) at physical processor 502 using interface signals conveyed with the interrupt requests for a targeted virtual core 503 by a multiprocessor interrupt controller (MPIC) 501. The interface signals conveyed between the MPIC 501 and physical core hardware 502 include all necessary information about the interrupt so that there is no need to perform memory mapped operations to an the interrupt controller or otherwise read from a core-external structure.

At step 511, the interrupt controller 501 forwards a first highest priority interrupt request (Interrupt A) to the physical core 502. Blocking mechanisms at the physical core 502 determine if the first interrupt request is blocked at step 512. As described herein, the blocking mechanism can be determined with special purpose LPIDR and INTLEVEL core registers which store thread ID, partition ID, and PRI-LEVEL values that are compared with the VPID, LPID, and priority values of the presented interrupt. In selected embodiments, there is no blocking mechanism required in the interrupt controller 501, although one could be used.

If the first interrupt is not blocked (negative outcome to detection step 512), it is forwarded to the targeted virtual core 503 which sends an interrupt acknowledge (TACK) at step 513. In this way, the interrupt controller 501 is notified that the presented interrupt (Interrupt A) was accepted by the virtual processor 503 for processing. In selected embodiments, the IACK may be atomically generated and the interrupt identifier may be stored in the core EPR register when the interrupt is taken in the virtual core 503.

At step 515, the virtual core 503 begins processing the first presented interrupt (Interrupt A). At this point, software at the virtual core 503 may change the blocking conditions locally if needed since the normal and guest priority registers are located at the physical core 502 and not at the interrupt controller 501.

Subsequently in time, the interrupt controller 501 forwards a second highest priority interrupt request (Interrupt B) to the physical core 502 at step 516. In response, blocking mechanisms at the physical core 502 determine if the second interrupt request is blocked at step 517. If the second interrupt is not blocked (negative outcome to detection step 517), it is forwarded to the targeted virtual core 503 which sends an interrupt acknowledge (IACK) for the second interrupt at step 518.

At this point, interrupt processing software at the virtual core 503 may choose to defer servicing of the second interrupt (Interrupt B) (step 520) and continue or resume servicing of the first interrupt (Interrupt A) (step 521). In selected embodiments, the interrupt processing software is a hypervisor or inactive guest. With conventional interrupt sequencing, the first received interrupt request (Interrupt A) would need to be suspended using one or more memory mapped operations to external resources so that the second-received interrupt request (Interrupt B) could be completely serviced upon receipt. However, this approach can introduce a very long delay in servicing the first interrupt request (Interrupt A) if the second interrupt request (Interrupt B) is for an inactive guest and requires hypervisor intervention to enforce EOI ordering. In contrast, by providing the virtual core 503 with the ability to use the targeted VPID, LPID, and priority to locally defer the second interrupt request (step 520) and continue servicing of the first interrupt request (step 521), the virtual processor 503 can take the interrupt in the appropriate partitioned context directly without hypervisor intervention. As a result, the interrupt management software is simplified and interrupt processing is expedited since the hypervisor need not enforce EOI ordering.

Figure 6:
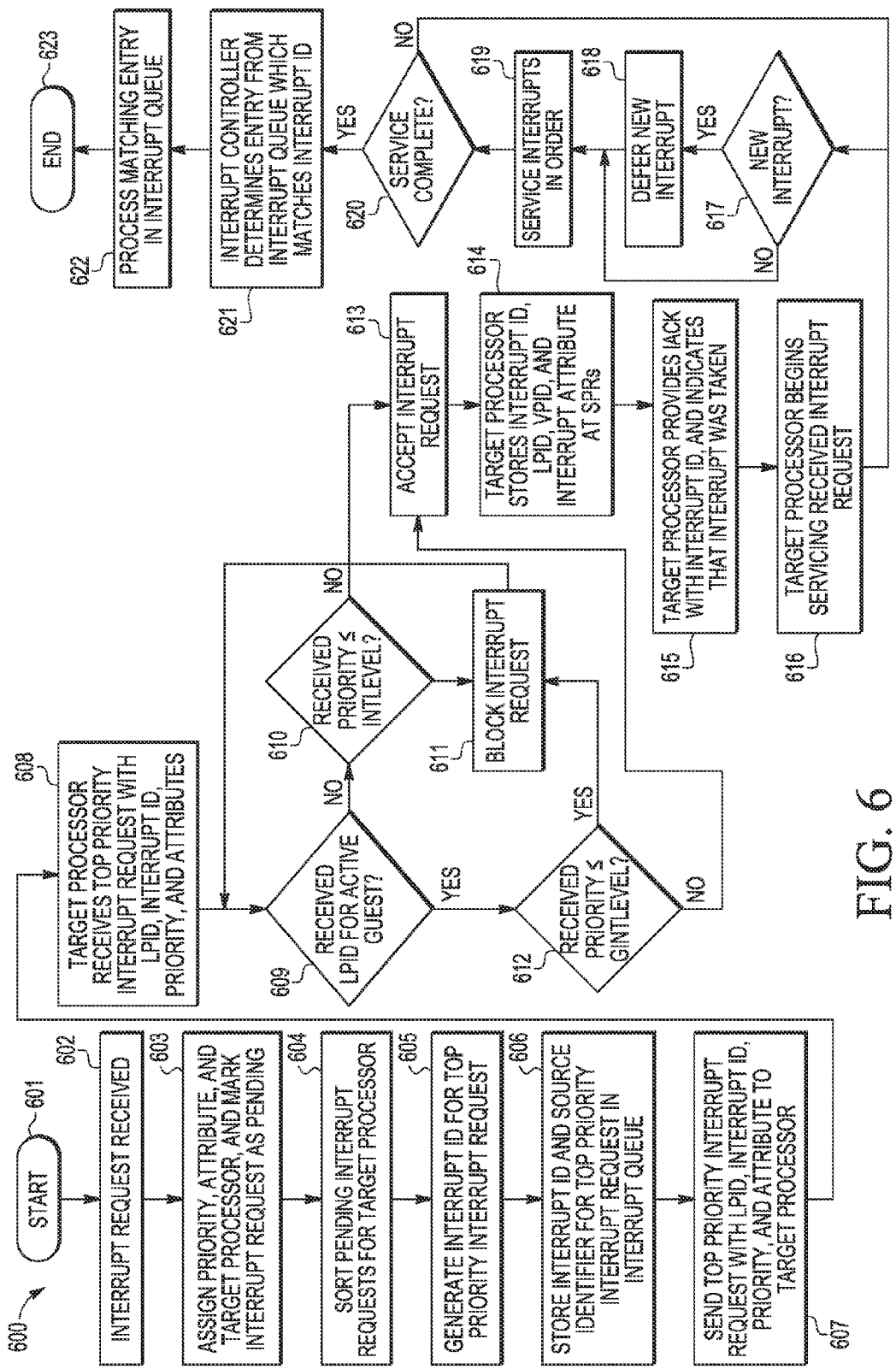
FIG. 6 depicts an example flow diagram according to a method for processing an interrupt request at an interrupt controller and target processor in accordance with selected embodiments of the present invention.

Referring now to FIG. 6, there is depicted an example flow diagram 600 of a method for processing an interrupt request at a partitioned interrupt controller and target processor in accordance with selected interrupt controller embodiments of the present invention. Once the method starts at step 601, an interrupt request is received at step 602. The interrupt request may be received from one or more interrupt sources coupled to an interrupt controller, where the interrupt sources may be internal or external to the data processing system.

At step 603, the interrupt controller responds to a received interrupt request by assigning interrupt controller information to the interrupt request and marking the interrupt request state as "pending." The assigned interrupt controller information may include an interrupt priority value, interrupt thread identifier, various interrupt attributes, and interrupt source identifier, along with the target processor and any state information associated with the interrupt request. The state information may include one or more indicators to indicate various states of the interrupt (e.g., pending, asserted, in service, invalid, etc.). In addition, partition information (e.g., LPID) is assigned or associated with each interrupt request. As will be appreciated, each interrupt source may be assigned a corresponding priority, thread, attributes, partition, and target processor, though different interrupt sources may share a same priority, thread, attributes, partition, and/or target processor (which refers to the processor that is intended to service the interrupt).

At step 604, the pending interrupt requests for each target processor are sorted. The interrupt controller may include sorting circuitry for determining which processor is the target processor for the interrupt request and sorting the interrupt requests for each target processor. The interrupt requests may be sorted by way of priority, age, interrupt type, etc., or any combination thereof. By implementing partitioned priority blocking at the target virtual core, the interrupt controller does not perform priority blocking and does not need to know the active partition for prioritized interrupt requests, thereby simplifying the design and operation of the interrupt controller.

At step 605, an interrupt identifier, or ID, corresponding to the top interrupt request is generated. The interrupt identifier or tag may be generated in any desired manner, and can be any value that uniquely identifies the interrupt request. The interrupt ID is guaranteed to be unique for a given partition since partition IDs (e.g., LPID) are associated with interrupts and interrupt controller accesses, and may be implemented as an index into a list of interrupts that are bound to a partition. At the processor, the interrupt ID is placed in the (G)EPR when an interrupt is taken and the interrupt ID is used to identify the interrupt when it is deferred, activated, EOI'd, or some other command is issued. Once the interrupt associated with a corresponding interrupt identifier has been serviced, the value of that interrupt identifier can be used again for a new and completely unrelated interrupt, if desired. The value of the interrupt identifier may have a particular significance (e.g., interrupt source number, etc.) or may be unrelated to the interrupt itself.

At step 606, the interrupt ID for the top priority interrupt request is sent to an outstanding interrupt request queue or similar structure to be remembered along with the interrupt source identifier. In addition, the top priority interrupt request is sent to the target processor at step 607, along with the associated context information, such as partition ID (LPID), thread ID (VPID), interrupt ID, interrupt priority, interrupt message data, and/or other interrupt attributes. In the example shown in FIG. 3, the interrupt controller 111 provides the top priority interrupt request through the interrupt request 131, the interrupt identifier 132, and other interrupt attributes 133-136 to processor 141. Other embodiments may provide this information using any desired and appropriate signaling scheme (e.g., some of this information may be provided serially, in parallel, may be time multiplexed, etc.).

Once an interrupt request and associated interrupt ID, LPID, VPID, interrupt priority, and attributes are received at the target processor as an interrupt package (step 608), the processor determines whether or not to accept the received interrupt request at steps 609-612. Any desired criteria may be used to determine whether or not to accept the received interrupt request. For example, software and/or hardware masking of interrupts may be used in the processor. In addition or in the alternative, the decision to accept or reject an interrupt may be deferred or suspended until there is a change in one or more mask values to allow acceptance of the interrupt, or until a new interrupt request is received. If an original interrupt request has not yet been accepted when a new interrupt request is received, then the processor will reject the original interrupt request in favor of the new interrupt request since a new interrupt request will only be sent to the processor if that new interrupt request was determined by sorting circuitry to be of higher priority.

In an example methodology, the processor determines whether or not to accept the received interrupt request by first comparing the interrupt package to the processor's internal interrupt state values stored at the SPRs at step 609. If the received LPID matches the guest LPID for the active guest (affirmative outcome to detection step 609), this indicates that the interrupt is for the active guest. In this case, the processor determines if the received priority value is less than or equal to the current priority level value stored in the guest priority blocking register (e.g., GINTLEVEL register) at step 612. If the received priority value is greater than the corresponding active guest's current priority level value (negative outcome to detection step 612), the interrupt request is signaled to the virtual processor which accepts the interrupt request at step 613. However, if the received priority value is less than or equal to the corresponding active guest's current priority level value (affirmative outcome to detection step 612), the interrupt request is blocked at step 611, in which case the interrupt request is not signaled to the virtual processor and it is ignored until it is replaced by the interrupt controller with a higher priority interrupt or software changes the current priority level value stored in the corresponding active guest's priority blocking register (e.g., GINTLEVEL) such that the interrupt can be signaled to the virtual processor.

Referring back to step 609, if the received LPID does not match the LPID for the active guest (negative outcome to detection step 609), then the interrupt is directed to the hypervisor by default. In this case, the processor then determines if the received priority value is less than or equal to the current priority level value stored in the hypervisor's priority blocking register (e.g., INTLEVEL register) at step 610. If the received priority value is greater than the hypervisor's current priority level value (negative outcome to detection step 610), the interrupt request is signaled to the virtual processor which accepts the interrupt request at step 613. However, if the received priority value is less than or equal to the hypervisor's current priority level value (affirmative outcome to detection step 610), the interrupt request is blocked at step 611, in which case the interrupt request is not signaled to the virtual processor and it is ignored until it is replaced by the interrupt controller with a higher priority interrupt or software changes the current priority level value stored in the hypervisor's priority blocking register (e.g., INTLEVEL) such that the interrupt can be signaled to the virtual processor.

As indicated at step 611, any blocked interrupt is stalled until it is replaced by a higher priority interrupt or the blocking condition goes away by writing a lower priority (G)INTLEVEL value. In effect, the flow diagram method loops back to the input to step 609.

If the interrupt request is accepted by the target processor at step 613, the target processor stores the interrupt ID, partition ID (LPID), thread ID (VPID), interrupt message data, and other interrupt attributes in memory (e.g., special purpose registers) for further processing at step 614. In particular, the received partition ID (LPID) may be stored and compared with the LPID value stored in LPID register (LPIDR) for purposes of steering the interrupt request to the guest or hypervisor, and the interrupt ID, VPID, interrupt message data, and/or other interrupt attributes may be stored for use in processing the interrupt request. At step 615, the target processor provides an interrupt acknowledge (IACK) with the interrupt identifier back to the interrupt controller to indicate that the interrupt was taken, indicating that the taken interrupt is guaranteed to be handled by the processor and can be put in the "in-service" state so that the taken interrupt will no longer be eligible for sorting or presented to the processor. At step 616, the target processor begins servicing the received interrupt request. As will be appreciated, the servicing of an interrupt request may be performed in any desired and appropriate manner.

During servicing of the interrupt request, the target processor may issue a partitioned command to the interrupt controller by executing an interrupt control instruction which performs a specialized store of the partitioned command, such as an EOI (end-of-interrupt) instruction to complete the interrupt service procedure, a "defer" instruction, a "suspend" instruction, or the like. When executed, the interrupt control instruction causes the target processor to write a partitioned command and associated LPID (and the desired interrupt ID) to a data payload which is securely stored to an interrupt controller command register having an address which is stored in a dedicated address register at the core. In this way, the target processor can independently manage the interrupts by securely issuing commands to the interrupt controller.

During servicing of the first interrupt, a new interrupt request (Interrupt B) may be received (affirmative outcome to detection step 617). Since the new interrupt request also includes associated context information, the processor core hardware can use the targeted VPID, LPID, and priority to direct the interrupt directly to the active (currently executing) guest partition or to the hypervisor. When the new interrupt is directed to an inactive guest, the processor core hardware can direct the new interrupt to the hypervisor to be handled as deemed necessary (e.g., to be serviced by the hypervisor on behalf of the guest, deferred, trigger a guest swap, etc.).

If the decision is made to defer the new interrupt request (as shown in step 618), the target processor may issue a partitioned command to the interrupt controller by performing a specialized store of the partitioned "defer" command and associated LPID (and any interrupt ID) to an interrupt controller command register having an address which is stored in a dedicated address register at the core. In addition, software may change the corresponding current priority register to the received priority value to block additional interrupts of that priority.

By deferring service of the new interrupt (step 618), the target processor may service the interrupts in order of receipt (step 619). Once servicing is complete (affirmative outcome to step 620), the processor issues an EOI command with the interrupt identifier, and the interrupt controller uses the interrupt identifier to select the corresponding entry in the outstanding interrupt request queue and then updates the state information for the corresponding interrupt source identifier to change the state of the interrupt request from the "in-service" to the "idle" state at steps 621-622 before the sequence ends (at step 623).

As will be appreciated, the processor-based partitioned priority blocking mechanism and programming model disclosed herein provide a quick and efficient mechanism for managing interrupt priority blocking on a partition basis using special purpose registers at the processor core so that interrupt management does not require first-presented, last-completed (i.e. stack ordering) ordering by software. In selected embodiments, the partitioned priority blocking mechanism may be embodied in hardware, in processing circuitry for executing software (e.g., including but is not limited to firmware, resident software, microcode, etc.), or in some combination thereof. As used herein, the term software refers to a collection of computer programs, procedures, and/or algorithms (along with related data) which provide instructions to control the function and/or operation of a computer or data processing system. Furthermore, the processor-based partitioned priority blocking mechanism may be embodied as a computer program product accessible from a computer-usable or computer-readable medium providing program code for use by or in connection with a computer or any instruction execution system, where a computer-usable or computer readable medium can be any apparatus that may include or store the program for use by or in connection with the instruction execution system, apparatus, or device. Examples of a non-transitory computer-readable medium include a semiconductor or solid state memory, magnetic tape, a removable computer diskette, a random access memory (RAM), a read-only memory (ROM), a rigid magnetic disk and an optical disk, such as a compact disk-read only memory (CD-ROM), compact disk-read/write (CD-R/W) and DVD. In addition, the non-transitory computer readable storage medium described herein may store special processor executable instructions which, upon execution, causes the processor to compare partition and priority level information from a received interrupt request with information stored in special purpose registers to determine if the interrupt request is blocked or forwarded to the targeted virtual processor.

By now it should be appreciated that there has been provided a circuit, method and system for managing interrupts at a processor using partition-based priority blocking, where the interrupts may be received from one or more virtualized hardware resources. In selected embodiments, the partition-based priority blocking is applied to a first physical interrupt request which is received at a processor as an interrupt package provided by an interrupt controller over a signal interface that is shared by multiple processor threads or cores at the processor. The interrupt package includes a first interrupt request, an interrupt identifier corresponding to the first interrupt request, a partition identifier identifying a partition at the processor associated with the first interrupt request, a priority value corresponding to the first interrupt request, an interrupt vector corresponding to the first interrupt request to the processor, and a thread identifier identifying a thread at the processor for the first interrupt request. The interrupt package is processed against one or more partitions (e.g., hypervisor, guest) running on one or more targeted virtual processors at the processor by comparing the priority value and partition identifier against at least a stored priority level (PRILEVEL) and stored partition identifier (LPID) retrieved from special purpose registers (INTLEVEL, GINLEVEL, LPIDR) at the processor to determine on a partition basis if the first interrupt request is blocked or forwarded to a targeted thread identified by the thread identifier (VPID). If the priority value exceeds the stored priority level for a partition running on the processor, the first interrupt request is accepted and the processor provides the interrupt controller with an interrupt acknowledge and the interrupt identifier corresponding to the first interrupt request. In selected embodiments, the special purpose registers include a first hardware register (LPIDR) for storing a logical partition identifier corresponding to a partition running on the processor, a second hardware priority blocking register (INTLEVEL) for storing the priority level corresponding to a trusted hypervisor partition running on the processor, a third hardware priority blocking register (GINLEVEL) for storing the priority level corresponding to an active guest partition running on the processor, a fourth external proxy register for storing the interrupt identifier and interrupt vector if the first interrupt request is directed to a trusted hypervisor identified by the partition identifier, and a fifth guest external proxy register for storing the interrupt identifier and interrupt vector if the first interrupt request is directed to a guest partition identified by the partition identifier. As disclosed, the interrupt package may be processed to block the first interrupt request if the partition identifier does not match a stored partition identifier retrieved from special purpose registers and the priority value does not exceed the priority level retrieved from the second hardware priority blocking register (INTLEVEL). Alternatively, the interrupt package may be processed to signal the first physical interrupt request to the targeted thread identified by the thread identifier if the first identifier does not match a stored partition identifier retrieved from special purpose registers and the priority value exceeds the priority level retrieved from the second hardware priority blocking register (INTLEVEL). In addition, the interrupt package may be processed to block the first interrupt request if the partition identifier matches a stored partition identifier retrieved from special purpose registers and the priority value does not exceed the priority level retrieved from the third hardware priority blocking register (GINTLEVEL). Alternatively, the interrupt package may be processed to signal the first physical interrupt request to the targeted thread identified by the thread identifier if the first identifier matches a stored partition identifier retrieved from special purpose registers and the priority value exceeds the priority level retrieved from the third hardware priority blocking register (GINTLEVEL). Upon determining that the first interrupt request is directed to a trusted hypervisor operating system, the interrupt identifier may be stored in an external proxy register at the processor, and interrupt message data, such as an interrupt source error code associated with the first interrupt request, may be stored in an external process identification register at the processor. However, upon determining that the first interrupt request is directed to a guest operating system, the interrupt identifier may be stored in a guest external proxy register at the processor, and interrupt message data, such as an interrupt source error code associated with the first interrupt request, may be stored in a guest external process identification register at the processor. In any case, write access to the non-guest hardware registers (e.g., LPIDR, INTLEVEL, EPR, EPIDR) at the processor may be restricted to the trusted hypervisor, while guest partitions have direct write access to guest hardware registers (e.g., GINTLEVEL, GEPR, GEPIDR). By providing special purpose priority blocking registers at the processor, the interrupt package may be received as a prioritized first physical interrupt request from an interrupt controller which does not include any priority blocking circuits.

In another form, there is provided a method and apparatus for processing information in a data processing system having a processor and an interrupt controller. In operation, the interrupt controller processes pending partitioned interrupt requests to identify and present to the processor a first interrupt package for a first prioritized physical interrupt request that is not blocked, where the first interrupt package includes a first interrupt request, a first interrupt identifier corresponding to the first interrupt request, a first partition identifier identifying a partition at the processor associated with the first interrupt request, a first priority value corresponding to the first interrupt request, and a first thread identifier identifying a thread at the processor for the first interrupt request. At the processor, the first interrupt package is received over a shared interface from the interrupt controller, and the first partition identifier from the first interrupt package is compared to at least a first stored partition identifier stored in a first hardware register at the processor to determine if the first prioritized physical interrupt request is directed to a partition at the processor. In particular, the first partition identifier may be compared to a guest partition identifier stored in the first hardware register to determine if the first prioritized physical interrupt request is directed to an active guest partition at the processor. If the first partition identifier matches the guest partition identifier, the first priority value may be compared to a guest priority level value stored in a guest priority hardware register at the processor to determine if the first prioritized physical interrupt request is blocked or forwarded. But if the first partition identifier does not match any guest partition identifier, the first priority value may be compared to a hypervisor priority level value stored in a hypervisor priority hardware register at the processor to determine if the first prioritized physical interrupt request is blocked or forwarded. In addition, the first thread identifier from the first interrupt package is processed to route the first prioritized physical interrupt request to a first targeted virtual processor at the processor. The processor also compares the first priority value from the first interrupt package to one or more priority level values stored in one or more priority hardware registers at the processor to determine if the first prioritized physical interrupt request is blocked or forwarded by the first targeted virtual processor. Upon determining that the first prioritized physical interrupt request is directed to a trusted hypervisor operating system, the first interrupt identifier is stored in an external proxy register at the processor and interrupt message data associated with the first interrupt request is stored in an external process identification register at the processor. However, upon determining that the first prioritized physical interrupt request is directed to a guest operating system, the first interrupt identifier is stored in a guest external proxy register at the processor and interrupt message data associated with the first interrupt request is stored in a guest external process identification register at the processor.

In yet another form, there is provided a data processing system and associated method of operation. The data processing system includes a partitioned interrupt controller that is coupled to a processor. The partitioned interrupt controller processes pending partitioned interrupt requests to identify and present to the processor a first interrupt request along with a first interrupt identifier corresponding to the first interrupt request, a first partition identifier identifying a partition associated with the first interrupt request, a first priority value corresponding to the first interrupt request, and a first thread identifier identifying a virtual processor associated with the first interrupt request. The processor includes one or more logical partition identifier registers, a hypervisor priority hardware register for storing a hypervisor priority level, a guest priority hardware register for storing a guest priority level, an external proxy register for storing interrupt identifier and vector information for interrupts directed to a hypervisor operating system, a guest external proxy register for storing interrupt identifier and vector information for interrupts directed to a guest operating system, an external process identifier register for storing interrupt message data for interrupts directed to the hypervisor operating system, and a guest external process identifier register for storing interrupt message data for interrupts directed to the guest operating system. Using these registers, the processor is configured to route the first interrupt request to a targeted virtual processor identified by the first thread identifier and then determine if the first interrupt request is blocked or forwarded by comparing the first priority value against the guest priority level if the first partition identifier matches against a logical partition identifier retrieved from the one or more logical partition identifier registers, and comparing the first priority value against the hypervisor priority level if the first partition identifier does not match a logical partition identifier retrieved from the one or more logical partition identifier registers.

Although the described exemplary embodiments disclosed herein are directed to methods and systems for managing partitioned interrupt requests with a processor-based priority blocking mechanism and programming model, the present invention is not necessarily limited to the example embodiments illustrate herein, and various embodiments of the partitioned priority blocking circuitry and methods disclosed herein may be implemented with other circuit components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "by," "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of managing interrupts at a processor, comprising:
   receiving at the processor an interrupt package provided by an interrupt controller, where the interrupt package comprises a first interrupt request, an interrupt identifier corresponding to the first interrupt request, a partition identifier identifying a partition at the processor associated with the first interrupt request, a priority value corresponding to the first interrupt request, and a thread identifier identifying a thread at the processor for the first interrupt request; and
   processing the interrupt package against one or more partitions running on the processor by comparing the priority value and partition identifier against at least a stored priority level and stored partition identifier retrieved from special purpose registers at the processor to determine on a partition basis if the first interrupt request is blocked or forwarded to a targeted thread identified by the thread identifier.

2. The method of claim 1, further comprising:
   accepting the first interrupt request if the priority value exceeds the stored priority level for a partition running on the processor; and
   providing to the interrupt controller an interrupt acknowledge and the interrupt identifier corresponding to the first interrupt request.

3. The method of claim 1, where the special purpose registers at the processor comprise:
a first hardware register for storing a logical partition identifier corresponding to a partition running on the processor; and
second hardware priority blocking register for storing the priority level corresponding to a partition running on the processor.

4. The method of claim 3, where write access to the first hardware register at the processor is restricted to the hypervisor.

5. The method of claim 1, further comprising storing the interrupt identifier and an interrupt vector corresponding to the first interrupt request to the processor in an external proxy register at the processor if the first interrupt request is directed to a hypervisor identified by the partition identifier.

6. The method of claim 1, further comprising storing the interrupt identifier and an interrupt vector corresponding to the first interrupt request to the processor in a guest external proxy register at the processor if the first interrupt request is directed to a guest partition identified by the partition identifier.

7. The method of claim 1, where the special purpose registers at the processor comprise:
a first hardware priority blocking register for storing a first priority level corresponding to the hypervisor running on the processor; and
a second hardware priority blocking register for storing a second priority level corresponding to an active guest running on the processor.

8. The method of claim 7, where processing the interrupt package comprises blocking the first interrupt request if the partition identifier does not match a stored partition identifier retrieved from special purpose registers and the priority value does not exceed the first priority level retrieved from the first hardware priority blocking register.

9. The method of claim 7, where processing the interrupt package comprises signaling the first interrupt request to the targeted thread identified by the thread identifier if the first identifier does not match a stored partition identifier retrieved from special purpose registers and the priority value exceeds the first priority level retrieved from the first hardware priority blocking register.

10. The method of claim 7, where processing the interrupt package comprises blocking the first interrupt request if the partition identifier matches a stored partition identifier retrieved from special purpose registers and the priority value does not exceed the second priority level retrieved from the second hardware priority blocking register.

11. The method of claim 7, where processing the interrupt package comprises signaling the first interrupt request to the targeted thread identified by the thread identifier if the first identifier matches a stored partition identifier retrieved from special purpose registers and the priority value exceeds the second priority level retrieved from the second hardware priority blocking register.

12. The method of claim 1, further comprising:
storing the interrupt identifier in an external proxy register at the processor upon determining that the first interrupt request is directed to a hypervisor operating system; and
storing interrupt message data, such as an interrupt source error code associated with the first interrupt request, in an external process identification register at the processor upon determining that the first interrupt request is directed to a hypervisor operating system.

13. The method of claim 1, further comprising:
storing the interrupt identifier in a guest external proxy register at the processor upon determining that the first interrupt request is directed to a guest operating system; and
storing interrupt message data, such as an interrupt source error code associated with the first interrupt request, in a guest external process identification register at the processor upon determining that the first interrupt request is directed to a guest operating system.

14. In a data processing system comprising a processor and an interrupt controller, a method comprising:
processing a first plurality of pending partitioned interrupt requests at the interrupt controller to identify and present to the processor a first interrupt package for a first prioritized physical interrupt request that is not blocked, where the first interrupt package comprises a first interrupt request, a first interrupt identifier corresponding to the first interrupt request, a first partition identifier identifying a partition at the processor associated with the first interrupt request, a first priority value corresponding to the first interrupt request, and a first thread identifier identifying a thread at the processor for the first interrupt request;
sending the first interrupt package from the interrupt controller over a shared interface to the processor;
comparing the first partition identifier from the first interrupt package to at least a first stored partition identifier stored in a first hardware register at the processor to determine if the first prioritized physical interrupt request is directed to a partition at the processor;
processing the first thread identifier from the first interrupt package to route the first prioritized physical interrupt request to a first targeted virtual processor at the processor; and
comparing the first priority value from the first interrupt package to one or more priority level values stored in one or more priority hardware registers at the processor to determine if the first prioritized physical interrupt request is blocked or forwarded by the first targeted virtual processor.

15. The method of claim 14, where comparing the first partition identifier comprises comparing the first partition identifier from the first interrupt package to a guest partition identifier stored in the first hardware register at the processor to determine if the first prioritized physical interrupt request is directed to an active guest partition at the processor.

16. The method of claim 15, where comparing the first priority value comprises comparing the first priority value from the first interrupt package to a guest priority level value stored in a guest priority hardware register at the processor if the first partition identifier matches the guest partition identifier stored in the first hardware register.

17. The method of claim 15, where comparing the first priority value comprises comparing the first priority value from the first interrupt package to a hypervisor priority level value stored in a hypervisor priority hardware register at the processor if the first partition identifier does not match any guest partition identifier stored in the first hardware register.

18. The method of claim 14, further comprising:
storing the first interrupt identifier in first proxy register at the processor upon determining that the first prioritized physical interrupt request is directed to a hypervisor operating system; and
storing interrupt message data associated with the first interrupt request in a first process identification register at the processor upon determining that the first prioritized physical interrupt request is directed to a hypervisor operating system.

19. The method of claim 1, further comprising:

storing the first interrupt identifier in a second proxy register at the processor upon determining that the first prioritized physical interrupt request is directed to a guest operating system; and storing interrupt message data associated with the first interrupt request in a second process identification register at the processor upon determining that the first prioritized physical interrupt request is directed to a guest operating system.

20. A data processing system comprising:

a partitioned interrupt controller for processing a plurality of pending partitioned interrupt requests to identify and present interrupt requests along with interrupt identifiers corresponding to the interrupt requests, a partition identifier identifying partitions associated with each interrupt request, a first priority value corresponding to each interrupt request, and a thread identifier identifying a virtual processor associated with each interrupt request; and a processor coupled to the partitioned interrupt controller comprising:
  one or more logical partition identifier registers;
  a hypervisor priority hardware register for storing a hypervisor priority level;
  a guest priority hardware register for storing a guest priority level;
  an external proxy register for storing interrupt identifier and vector information for interrupts directed to a hypervisor operating system;
  a guest external proxy register for storing interrupt identifier and vector information for interrupts directed to a guest operating system;
  an external process identifier register for storing interrupt message data for interrupts directed to the hypervisor operating system; and
  a guest external process identifier register for storing interrupt message data for interrupts directed to the guest operating system;
where the processor is configured to route the first interrupt request to a targeted virtual processor identified by the first thread identifier and then determine if the first interrupt request is blocked or forwarded by comparing the first priority value against the guest priority level if the first partition identifier matches against a logical partition identifier retrieved from the one or more logical partition identifier registers, and comparing the first priority value against the hypervisor priority level if the first partition identifier does not match a logical partition identifier retrieved from the one or more logical partition identifier registers.

* * * * *

UNITED STATES PATENT AND TRADEMARK OFFICE
CERTIFICATE OF CORRECTION

PATENT NO. : 9,436,626 B2
APPLICATION NO. : 13/570874
DATED : September 6, 2016
INVENTOR(S) : Bryan D. Marietta et al.

Page 1 of 1

It is certified that error appears in the above-identified patent and that said Letters Patent is hereby corrected as shown below:

In the Claims

Column 21, Line 27: Please replace "the hypervisor" with "a hypervisor".

Signed and Sealed this
Twenty-sixth Day of August, 2025

Coke Morgan Stewart
*Acting Director of the United States Patent and Trademark Office*